United States Patent [19]

Calhoun et al.

[11] 3,876,994

[45] Apr. 8, 1975

[54] PLANAR BIAS FIELD CONTROL OF MAGNETIC BUBBLE DOMAIN APPARATUS

[75] Inventors: Bertram A. Calhoun, Saratoga, Calif.; Hsu Chang, Yorktown, N.Y.; Laurence L. Rosier, Amawalk, N.Y.; John C. Slonczewski, Katonah, N.Y.

[73] Assignee: International Business Machines Corporation, Armonk, N.Y.

[22] Filed: June 22, 1972

[21] Appl. No.: 265,366

[52] U.S. Cl. .................. 340/174 TF; 340/174 EB; 340/174 PM; 340/174 VA

[51] Int. Cl. .......................................... G11c 11/14

[58] Field of Search ............................. 340/174 TF

[56] References Cited

UNITED STATES PATENTS 3,602,911 8/1971 Kurtzig ......................... 340/174 TF 3,662,359 5/1972 Genovese ...................... 340/174 TF

*Primary Examiner*—James W. Moffitt

*Attorney, Agent, or Firm*—Jackson E. Stanland

[57] ABSTRACT

A bias magnetic field $H_p$ is produced in the plane of the magnetic sheet in which bubble domains exist, in any type of bubble domain apparatus. This planar bias field alters the spin system within the domain wall which leads to a change in domain wall mobility. Thus, the presence and absence of the planar bias field can be used as a control to trigger domain propagation and domain collapse throughout the entire magnetic sheet, or in selected portions of the magnetic sheet. Block access of domain information is thereby made possible as well as gating and decoding functions.

9 Claims, 6 Drawing Figures

PLANAR BIAS FIELD CONTROL OF MAGNETIC BUBBLE DOMAIN APPARATUS

BACKGROUND OF THE INVENTION

1. Field of the Invention

This invention relates to magnetic bubble domain apparatus and more particularly to such an apparatus in which a magnetic bias field is provided in the plane of the magnetic sheet to control domain motion and device functions derived from domain motion.

2. Description of the Prior Art

Magnetic bubble domain systems are well known in the art, and reference is made to U.S. Pat. No. 3,460,116, as well as to copending application Ser. No. 158,232, filed June 30, 1971, now U.S. Pat. No. 3,689,902, and assigned to the present assignee. These references describe magnetic bubble domain memories which have different means for propagating domains within the magnetic sheet that supports the domains. However, in both of these references and in buble domain systems generally, a magnetic bias field $H_z$ is provided normal to the plane of the magnetic sheet which houses the domains. This will be termed the normal bias field $H_z$. Its function is to stabilize the size of the bubble domains within the magnetic sheet in order to provide a usuable domain apparatus. As is well known, this normal bias field can be provided by a current-carrying coil surrounding the magnetic sheet, by a permanent magnetic layer, or by a magnetic layer in contact with and exchange-coupled to the magnetic sheet housing the domains.

Propagation of domains within a magnetic sheet, as well as nucleation and collapse of domains in a magnetic sheet, requires a spatially varying magnetic field normal to the plane of the magnetic sheet. Domain propagation occurs in the direction of decreasing net magnetic field normal to the plane of the sheet. Various means are known for providing domain propagation using this principle. In one case, conductor patterns carrying currents are used to provide localized changes in the magnetic field normal to the plane of the magnetic sheet. This is the type of propagation used in U.S. Pat. No. 3,460,116.

Another means of domain propagation uses an overlay of soft magnetic elements in conjunction with a reorienting magnetic field in the plane of the magnetic sheet. The reorienting field magnetizes the magnetic overlay elements to create magnetic fields normal to the plane of the magnetic sheet. In this way, localized gradients in the net magnetic field normal to the magnetic sheet are provided and the domains will move in the direction of decreasing net magnetic field.

Without the magnetic overlays, the reorienting, in-plane magnetic field will not provide domain propagation. It is only when localized magnetic fields normal to the plane of the magnetic sheet are produced by the overlay elements that domain propagation results.

In prior magnetic bubble domain systems, control of propagation, nucleation, and collapse of domains in the magnetic sheet is provided by directly changing the magnetic field or current drive used in the propagation means, or the drive used to collapse the domains. While this is suitable for many purposes, it does not provide a sensitive additional control which can be used to rapidly change propagation and collapse of domains in the entire magnetic sheet, or in selected portions of the magnetic sheet.

Accordingly, it is a primary object of this invention to provide a control for domain propagation and collapse in a magnetic sheet.

It is another object of this invention to provide a control for domain propagation and collapse in the entire magnetic sheet or in selected portions of the magnetic sheet.

It is still another object to provide a control of domain wall mobility in a magnetic sheet using means which can be easily fabricated directly on the magnetic sheet.

It is a futher object of this invention to provide means for accessing blocks of information within a magnetic sheet.

It is still further object of this invention to provide a means for controlling domain propagation and collapse in a magnetic sheet which can be used together with conventional domain propagation means.

BRIEF SUMMARY OF THE INVENTION

Applicants have discovered that a bias field in the plane of the magnetic sheet in which domains exist will change the distribution of magnetic spins in a magnetic bubble domain wall thereby leading to a change in domain wall mobility. In Ga substituted YIG, the magnitude of this planar bias field is generally in the range 4–20 Oe (i.e., of the order of 100/h Oe, where $h$ is the thickness of the magnetic sheet in micrometers). However, in other bubble domain materials, this range may vary. This is a threshold type of effect where mobility changes will occur when the planar bias field reaches a level which is not a sharp, precisely defined level.

The planar bias field is separate and distinct from the normal bias field $H_z$ used to stabilize the size of domains in the magnetic sheet. Thus, an additional control is provided for domain propagation and collapse in the entire magnetic sheet, or in selected portions of the magnetic sheet. An external planar bias source, such as a current -carrying coil, can be used to provide localized planar bias fields in selected regions of the magnetic sheet, thereby leading to increased domain mobility in the regions of the magnetic sheet in which the planar bias field exists.

Block access of data at selected locations in the magnetic sheet is possible by using localized planar bias fields. Such localized fields are conveniently provided by current carrying strip lines arranged in X-Y coordinate fashion across the magnetic sheet.

The planar bias field is to be distinguished from planar magnetic fields provided in existing bubble domain systems. Those existing systems use planar magnetic fields to interact with magnetic overlays to provide magnetic fileds normal to the plane of the magnetic sheet for propagation of domains in the magnetic sheet. For instance, a propagation means using magnetic overlays in conjunction with AC and DC magnetic fields in the plane of the magnetic sheet is shown in the IBM Technical Disclosure Bulletin, Vol. 13, No. 11, April 1971, on page 3307. In this propagation means, the DC magnetic field and the AC magnetic field have approximately the same magnitude and both are used for propagation of domains due to their interaction with the permalloy pattern.

Thus, the in-plane magnetic fields used in the prior art for propagation of domains require the presence of a magnetic overlay in order to convert the universal planar field to localized field gradients in the magnetic sheet. This is contrasted with the discovery of the present applicants that a planar bias field will produce changes in domain wall mobility. Such a planar bias field can be used with any type of domain propagation or collapse in order to provide a control feature for the propagation or collapse.

These and other objects, features, and advantages will be more apparent in the following more particular description of the preferred embodiments.

DETAILED DESCRIPTION OF THE PREFERRED EMBODIMENTS

Figure 1:
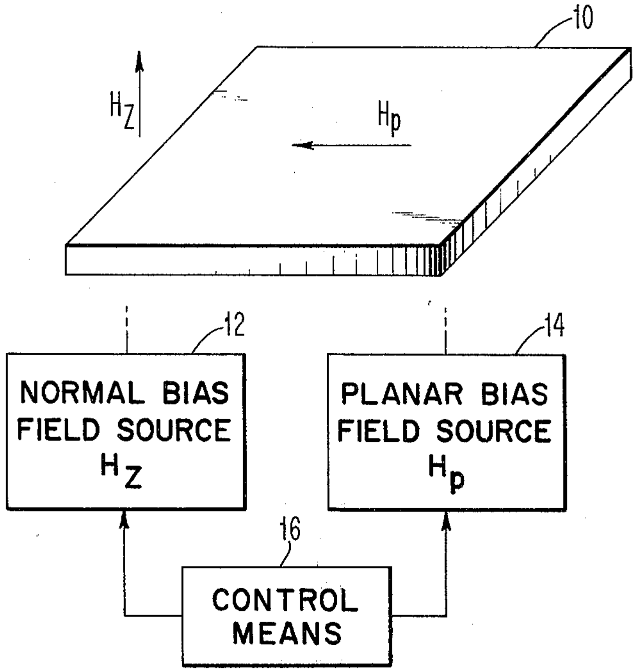
FIG. 1 is a conceptual drawing of a magnetic bubble domain apparatus having means for providing a planar magnetic bias field $H_p$.

FIG. 1 shows a bubble domain appratus in which a planar bias field $H_p$ can be controllably produced in magnetic sheet 10. This magnetic sheet is any magnetic sheet suitable for supporting magnetic bubble domains therein, including but not limited to garnet films and other materials. A normal bias field $H_z$ is produced by normal bias field source 12. Field $H_z$ is directed normal to the plane of magnetic sheet 10 and has a magnitude sufficient to provide cylindrical magnetic bubble domains in sheet 10. Bias field $H_z$ is used to stabilize the size of magnetic bubble domains in sheet 10 in a known manner. Normal bias field source 12 can be a current-carrying coil surrounding magnetic sheet 10, a permanent magnet layer, or a magnetic layer located in contact with magnetic sheet 10 and exchange-coupled thereto. All of these are conventionally known.

A planar bias field source 14 produces a magnetic bias field $H_p$ in the plane of magnetic sheet 10. Planar bias field source 14 can be a current-carrying coil surrounding magnetic sheet 10 or a current-carrying stripline located on sheet 10. Preferably, the magnitude of planar bias field $H_p$ can be varied to selectively alter the mobility of domain walls within magnetic sheet 10.

The direction of planar field $H_p$ in magnetic sheet 10 does not appear to be fixed; however, a maximum effect on domain wall mobility might be realized if $H_p$ is substantially perpendicular to the direction of propagation. Generally, the magnitude of planar bias field $H_p$ is about 4–20 Oe but this can be varied over a wide range.

A control means 16 is ued to regulate operation of the normal bias field source 12 and also the planar bias field source 14. In this way, the planar bias field $H_p$ can be produced at varying times. In this manner, a controlled domian propagation and collapse in magnetic sheet 10 will be achieved. This will be more fully explained with reference to the various device embodiments described with respect to FIGS. 3–6.

In FIG. 1, a means for propagating domains in sheet 10 is not shown. However, conventional propagation means can be used. For instance, the propagation means can be comprised of magnetic elements together with a reorienting in-plane magnetic field, or conductor propagation structures.

Figure 2:
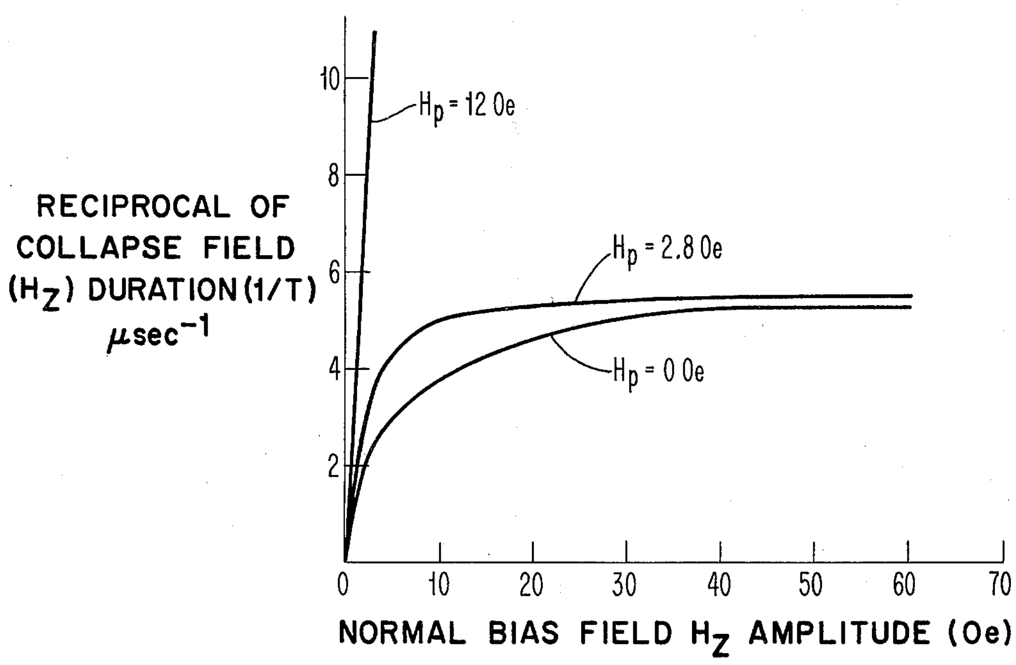
FIG. 2 is a graph of the reciprocal of the duration of the magnetic field required to collapse a domain plotted against the amplitude of the magnetic pulse field excess over the static collapse field, normal to the plane of the magnetic sheet, for various values of the in-plane bias field $H_p$. This illustrates the change in mobility of the domain walls due to the planar bias field.

FIG. 2 illustrates the effect of the planar bias field on domain wall mobility. This figure is a plot of the reciprocal of the duration of the magnetic field required to collapse domains in magnetic sheet 10 plotted as a function of the amplitude of the collapse magnetic field normal to magnetic sheet 10. The reciprocal of the duration (T) of the collapse magnetic field, when multiplied by the bubble domain radius, is a measure of the domain velocity in sheet 10. Therefore, FIG. 2 provides a representation of the velocity of domains in sheet 10 for various values of planar bias field $H_p$.

The curves of FIG. 2 are obtained by first selecting a fixed value of planar bias field $H_p$. For each value of bias field $H_p$, the amplitude of the normal bias field required to collapse the domain is varied for seclected pulse widths of the collapse bias field. For the particular plot shown in FIG. 2, the magnetic sheet was comprised of gallium substituted YIG ($Y_3Ga_{1.5}Fe_{3.5}O_{12}$) having domains with a diameter of approximately 25 $\mu$m.

FIG. 2 shows that, in the case of no planar bias field, the velocity of domains within magnetic sheet 10 reaches a saturating value. However, in the presence of an in-plane bias field the domain velocity is significantly increased and saturation, if any, occurs only at very high velocities. Thus, the presence and absence of a planar bias field can serve as a trigger for domain movement in sheet 10, and for domain collapse in sheet 10. For instance, if the drive force required to propagate domains in sheet 10 is not sufficient to move these domains, application of a planar bias field will increase the mobility of the domain such that the same drive force will now be able to propagate the domains in magnetic sheet 10. In the same manner, a normal pulse field of given length which is insufficient to collapse domains in sheet 10 will be sufficient to collapse these domains if a planar bias field exists in sheet 10.

In the following discussion, the theory by which a planar bias field changes domain wall mobility will be explained. After this, various embodiments utilizing this phenomenon will be shown to illustrate application of this phenomenon in usable bubble domain devices.

Theory of Operation

The planar bias field $H_p$ makes the bubble domains more mobile, and thereby more easily moved by the propagation means. Planar bias field $H_p$ magnetically couples with the magnetic moments of the spins in the domain wall. That is, the field $H_p$ tends to hold the spins in the domain wall in a certain direction which is the direction of $H_p$. As $H_p$ increases in magnitude, its effect on the spins increases, and the domain velocity becomes more stable as the drive (propagation) field increases.

In theory, it is expected that the greatest effect of the field $H_p$ on domain mobility might occur when $H_p$ is parallel to the plane of the domain wall and perpendicular to the direction of desired domain propagation.

The planar bias field $H_p$ required to effect a change in domain wall mobility is related to the bubble domain material parameters in the following way:

$$H_p \approx 4(2\pi A)^{1/2}/h$$

where $A$ = exchange coefficient of the magnetic material;

$h$ = thickness of magnetic material.

For a field $H_p$ of this magnitude, of larger, the domain wall mobility will be changed. That is, a field $H_p$ of this order of magnitude will contribute energy in an amount of the same order as the internal energies of the domain wall. This equation is generally true for garnets and magnetoplumbites (hexaferrites). Also, it is valid for any material which does not have a magnetic anisotropy tending to make certain directions in the plane of the magnetic sheet preferred directions. In general, the phenomenon of domain wall mobility changes due to a planar bias field is fundamental to all bubble domain materials. The magnitude of the planar bias field required to observe this effect varies with different materials.

For a given drive force, a larger planar bias field is needed for thinner magnetic sheets than for thick sheets, as is apparent from this expression.

Usable Embodiments

FIG. 3

Figure 3:
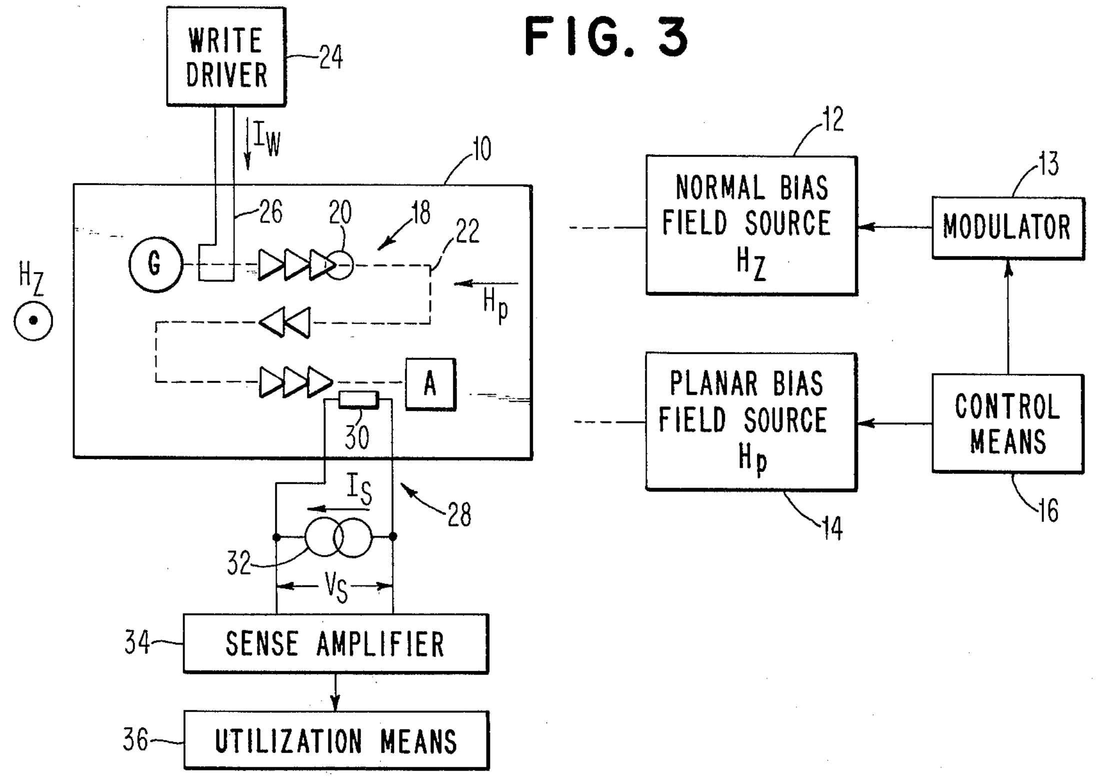
FIG. 3 is a system configuration for a selectively controlled bubble domain system using a planar bias field as the control means.

FIG. 3 shows a bubble domain system using magnetic elements as propagation means for movement of domains in sheet 10. In this FIG. and in the other FIGS., the same reference numerals will be used wherever possible.

The propagation means in FIG. 3 is generally designated 18, and is comprised of a series of wedge-shaped magnetically soft elements. A preferred material for these elements is permalloy. This is a conventional "angel fish" propagation means in which domains 20 move from one permalloy wedge to another when the normal bias field $H_z$ is modulated. If desired, the wedges can be etched in magnetic sheet 10. Accordingly, modulation of bias field $H_z$ causes the domains to propagate along the path 22.

Domains are produced by generator G which operates in a known fashion. The presence and absence of domains for propagation by means 18 is under control of the write driver 24, which provides current pulses $I_w$ in conductor loop 26. This either allows the domains to be propagated by means 18, or collapses them.

After propagation along path 22, the domains are sensed by a sensing apparatus generally designated 28. In this case, a magnetoresistive sensing element 30 will undergo a change in its resistance depending upon whether or not a domain 20 is in flux-coupling proximity to the sensing element. If a constant current $I_s$ is provided through the sensing element by constant current source 32, a voltage signal $V_s$ will develop when a domain is in fluxcoupling proximity to element 30. The signal $V_s$ is amplified by sensing amplifier 34 and provided to a utilization means 36, which can be any means responsive to the electrical signal output indicative of the presence and absence of domains in magnetic sheet 10. A magnetoresistive detector of this type is described in more detail in an article by G. S. Almasi, et al., *Journal of Applied Physics*, Vol. 42, No. 4, Mar. 15, 1971 at page 1,268.

The domains propagating along path 22 then are destroyed by annihilator A. This annihilator can be any of a number of known annihilators which use localized magnetic fields for collapse of domains.

To provide controlled propagation of domains in magnetic sheet 10, a planar bias field $H_p$ is used. That is, the amplitude of the normal bias field modulation is chosen to be such that domains 20 merely oscillate between adjacent permalloy wedges, rather than propagating along path 22, in the absence of planar bias field $H_p$. However, when planar bias field $H_p$ is provided by source 14, the domain mobility increases and propagation along path 22 will result. Thus, a control of domain propagation and data accessing in magnetic sheet 10 are obtained.

In the use of the planar bias field $H_p$, it should be noted that the magnitude of this field can be changed between two non-zero values, rather than being turned off and on. This may be utilized to provide even faster control.

FIG. 4

Figure 4:
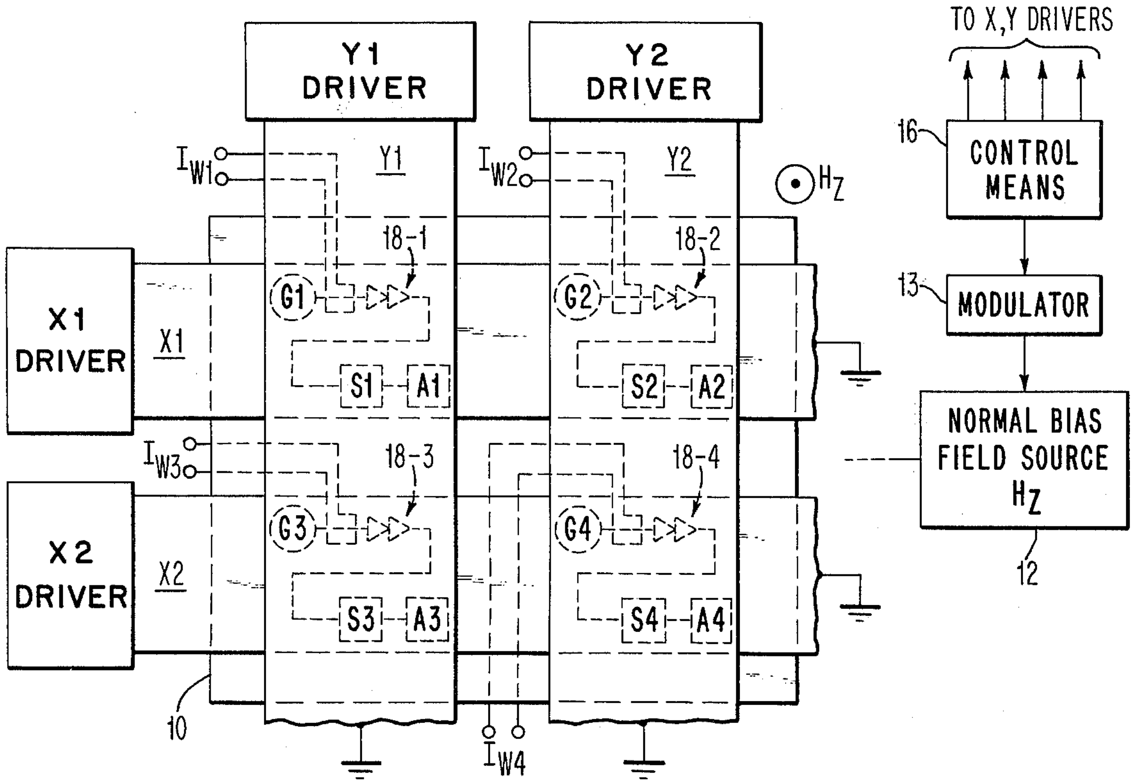
FIG. 4 is a bubble domain system in which block access of data is obtained using localized planar bias fields produced by overlying strip lines on the magnetic sheet in which the domains exist.

FIG. 4 shows a bubble domain apparatus in which the planar bias field $H_p$ is produced in localized regions to effect propagation of domains in those localized regions. This enables one to achieve block accessing of data in the selected region of a magnetic sheet. In addition, selective gating and decoding functions can be achieved.

In more detail, a magnetic sheet 10 has horizontal conducting strip lines X1 and X2 located over it. Also located over magnetic sheet 10 and insulated from strip lines X1 and X2 are vertical conducting strip lines Y1 and Y2. The horizontal and vertical strip lines are provided with currents by the associated drivers as indicated.

Currents in strip lines X1, X2, Y1 and Y2 will produce a planar bias field in magnetic sheet 10. By activating these strip lines, one may obtain coincident current selection. For instance, to provide a planar bias field of proper magnitude for domain movement in the part of magnetic sheet 10 defined by the intersection of strip lines X1 and Y1, coincident currents are produced in strip lines X1 and Y1. Thus, the mobility of domains in magnetic sheet 10 which are in the area of intersection of strip lines X1 and Y1 will be sufficiently affected for domain movement. If, at this time, currents are not present in strip lines Y2 and X2, then only the domain information in the area defined by the intersection of X1 and Y1 will be accessed. Therefore, block access of data is achieved. Of course, a current in any stripline will produce a planar bias field in the manetic sheet along the length of the stripline. However, its magnitude is by design not sufficient to cause domain propagation except when it is combined with another in-plane bias field produced by a coincident current in an intersecting stripline.

Located on magnetic sheet 10 in the region of intersection of the coordinate conductors are propagation means 18-1, 18-2, 18-3, and 18-4. These propagation means are the same as the propagation means of FIG. 3, except that the sensing apparatus 28 of FIG. 3 is now indicated by a block labelled S1, S2, S3, or S4.

Each propagation means 18-1, . . . ,18-4 operates the same as that of FIG. 3. That is, with the normal bias field amplitude $H_z$, domain propagation by any of the propagation means is not achieved until a planar bias field $H_p$ is produced in the selected area of magnetic sheet 10. When coincident currents are pesent in the conducting strip lines, localized planar bias fields are produced which then allow the domains to be propagated in that area of the magnetic sheet defined by the intersection of conducting strip lines having coincident currents therein.

As with FIG. 3, a normal bias field source 12 is provided and a modulator 13 is also provided for changing the amplitude of the normal bias field $H_z$. The modulator 13 is under control of control means 16, which also provides trigger inputs to the X and Y conducting strip line drivers.

FIG. 5

Figure 5:
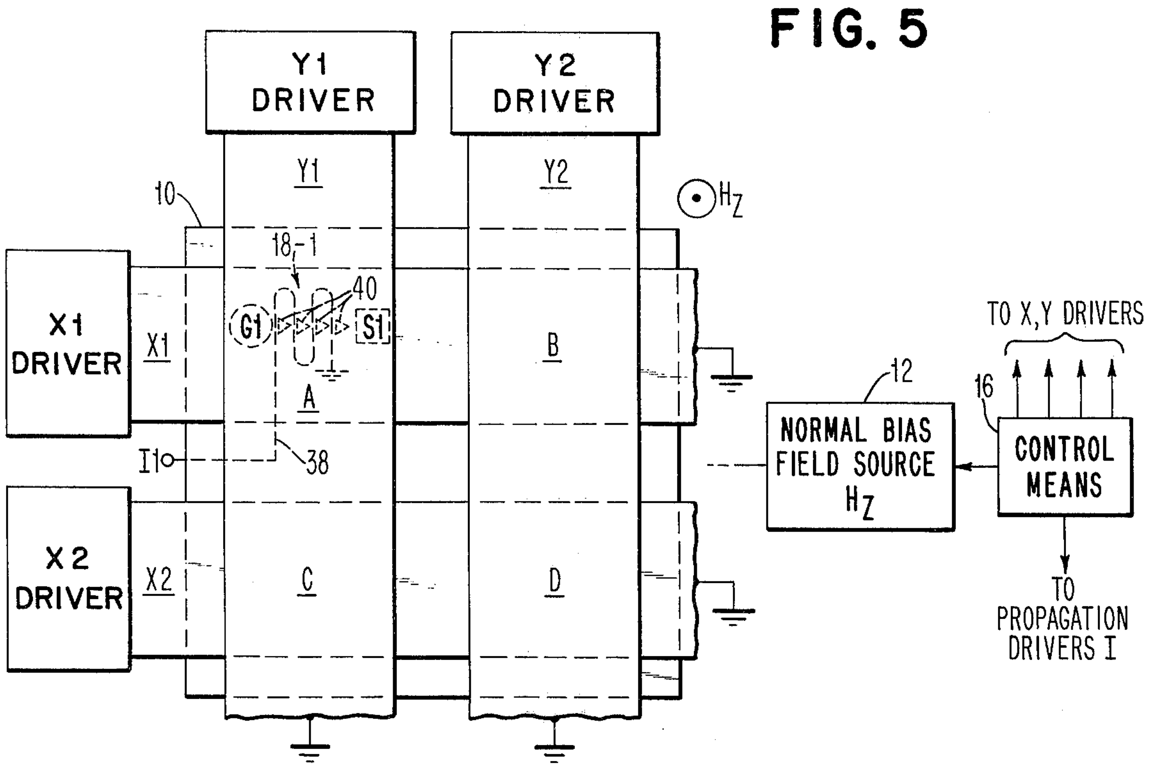
FIG. 5 is an illustration of a magnetic domain system providing block access of information using conductor propagation techniques together with localized planar bias fields produced by strip lines adjacent the magnetic sheet in which the domains exist.

FIG. 5 shows an arrangement for block accessing of data similar to that shown in FIG. 4, the difference being that the propagation means 18-1, . . . , 18-4 used in the data blocks A, B, C, D is a conductor propagation means, rather than a magnetic overlay propagation means. Although the propagation means 18-2, 18-3, and 18-4 are not shown, it should be understood that they exist in the regions B, C, and D of magnetic sheet 10, respectively.

The propagation means 18-1 is a single wire conductor propagation means which uses current pulses in conductor 38 to provide localized magnetic fields for movement of domains from the generator G1 to the sensor S1. Without the presence of a localized planar bias field, the current pulses provided by the current generator I1 are not sufficient to move domains. However, when coincident currents are present in conducting strip lines X1 and Y1, a planar bias field will be produced in the region (A) of propagation means 18-1, and domains will then propagate from generator G1 to sensor S1. In propagation means 18-1, an annihilator is not shown although one could easily be provided in a well known manner. Also, domains can be recirculated after being sensed. The permalloy wedges 40 in propagation means 18 are provided to give a preferred direction to domain movement.

Also provided in FIG. 5 is a normal bias field source 12 for provision of a stabilizing bias field $H_z$ and a control means 16 for control of the operation of source 12. Control means 16 also provides trigger inputs to the X and Y conducting strip line drivers and to the propagation drivers I used to move domains in selected regions of magnetic sheet 10.

FIG. 6

Figure 6:
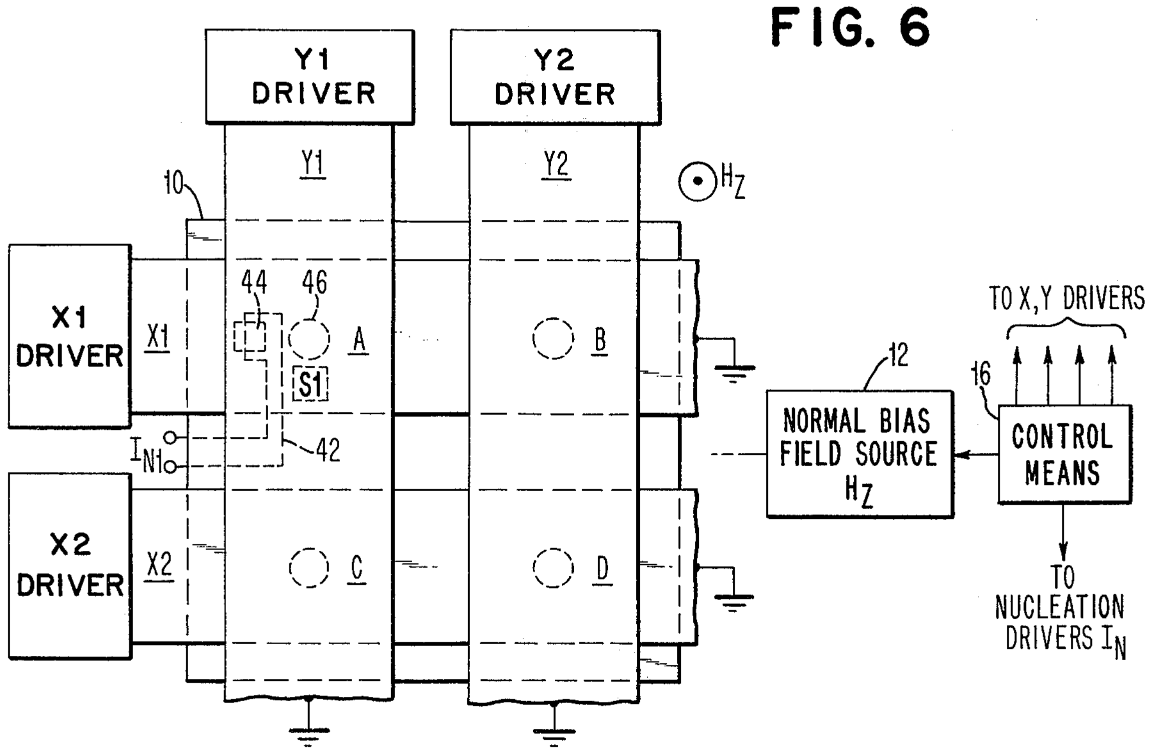
FIG. 6 is a bubble domain system in which nucleation and collapse of domains in localized areas is under control of a planar bias field locally produced to effect nucleation and collapse of domains in selected areas of the magnetic sheet.

FIG. 6 is an embodiment of a bubble domain apparatus in which conducting X and Y strip lines are used to provide localized planar bias fields, in the manner described previously with respect to FIGS. 4 and 5. However, rather than propagating domains in the regions A, B, C and D, domains are selectively nucleated and collapsed in these regions. The presence and absence of domains is representative of binary information. Accordingly, a domain nucleation means is located at the various block positions A, B, C, and D. For instance, the current source $I_{N1}$ produces current in conducting loop 42 which creates a localized magnetic field at one end of permalloy element 44. This localized magnetic field combines with a normal bias field $H_z$ to nucleate a domain at the end of permalloy bar 44, in accordance with the technique described more fully in U.S. Pat. No. 3,662,359. Bubble domains 46 are detected by a sensor S1.

Domains 46 exist in magnetic sheet 10 in the absence of a planar bias field $H_p$. That is, the normal bias field $H_z$ is not sufficient to collapse domains 46, unless a localized planar bias field is produced. For instance, to collapse domain 46 at memory locaion A, coincident currents are applied in conducting strip lines X1 and Y1. This will increase the domain mobility of domain 46, and it will be collapsed by normal bias field $H_z$. The resulting change in flux will be detected by sensor S1.

Associated with the magnetic sheet 10 is the normal magnetic bias field source 12 and a control means 16 for regulation of source 12. Control means 16 also provides trigger pulses to the nucleation drivers $I_N$ as well as to the X and Y drivers provided for the conducting strip lines.

What has been described is the use of a planar bias field to affect the domain mobility of magnetic bubble domains in a magnetic sheet. This planar bias field is not the magnetic field associated with a propagation means but rather is a separate magnetic field which couples to the spin systems associated with the domain walls. It should be understood that any type of propagation means or domain collapse means can be used in the memory sheet and can be controllably affected by the planar bias field. In addition, the use of the planar bias field can be applied to any type of bubble domain device, including memory devices, logic circuitry, decoders, storage devices, display devices, etc. Further, the planar bias field can be used to advantage in known types of magnetic bubble domain material.

What is claimed is:

1. A magnetic bubble domain apparatus,
 a magnetic medium in which said domains exist,
 planar bias means for producing a magnetic bias field substantially in the plane of said magnetic medium,
 propagation means adjacent said magnetic medium for moving domains in said medium where said planar bias field is applied in selected localized regions of said magnetic medium.

2. The apparatus of claim 1, where said planar bias means is comprised of an electrical conductor located adjacent to said magnetic medium.

3. The apparatus of claim 1, where said planar bias means is comprised of a plurality of electrical current carrying conductors arranged in coordinate fashion across said magnetic medium.

4. A magnetic bubble domain apparatus, comprising:
 a magnetic medium in which said domains exist,
 planar bias means for producing a magnetic bias field substantially in the plane of said magnetic medium,
 propagation means adjacent said magnetic medium for moving domains in said medium, where said planar bias field $H_p$ is related to the properties of said magnetic medium by the following expression:

$$H_p \gtrsim 4(2\pi A)^{1/2}/h$$

where:
 $A$ is the exchange coefficient of the magnetic medium material, and
 $h$ is the thickness of said magnetic medium.

5. The apparatus of claim 4, where said planar bias means is comprised of conductors located adjacent to said magnetic sheet, having current drivers connected thereto.

6. The apparatus of claim 5, where said conductors are arranged in coordinate fashion across said medium.

7. In a magnetic bubble domain apparatus including a magnetic medium in which said bubble domains can be propagated and a propagation means for moving said bubble domains in said magnetic medium, the improvement being additional magnetic field means for producing a planar magnetic bias field substantially in the plane of said magnetic medium, said bias field being substantially constant in direction and magnitude during propagation of said domains by said propagation means, where said planar bias field is related to the properties of said magnetic medium by the expression:

$$H_p \gtrsim 4(2\pi A)^{1/2}/h$$

where $A$ is the exchange coefficient of the magnetic medium and $h$ is the thickness of the magnetic medium.

8. An apparatus for moving magnetic bubble domains in a magnetic medium, comprising:

a propagation means which is sufficient to move domains in said medium only when their mobility in said medium has a first value, bias means for making the mobility of domains in said medium have said first value, said bias means being independent of said propagation means and not essential to the operation of said propagation means, where said bias means produces a planar bias field $H_p$ substantially in the plane of said magnetic medium having a magnitude $$H_p \gtrsim 4(2\pi A)^{1/2}/h ,$$

where $A$ is the exchange coefficient of the magnetic medium, and $h$ is the thickness of the magnetic medium.

9. In an apparatus for moving magnetic bubble domains in a magnetic medium which includes said magnetic medium and first means for applying magnetic fields to said medium for moving bubble domains therein, the improvement comprising:

second means for producing a planar bias field in the plane of said magnetic medium which is dependent only on material parameters of said magnetic medium, said planar bias field being substantially independent of any other magnetic fields which are applied to said magnetic medium, said planar bias field $H_p$ being related to the material parameters of the magnetic medium by the expression:

$$H_p \gtrsim 4(2\pi A)^{1/2}/h$$

where $A$ is the exchange coefficient of the magnetic medium and $h$ is the thickness of the magnetic medium.

* * * * *